No. 759,937. Patented May 17, 1904.

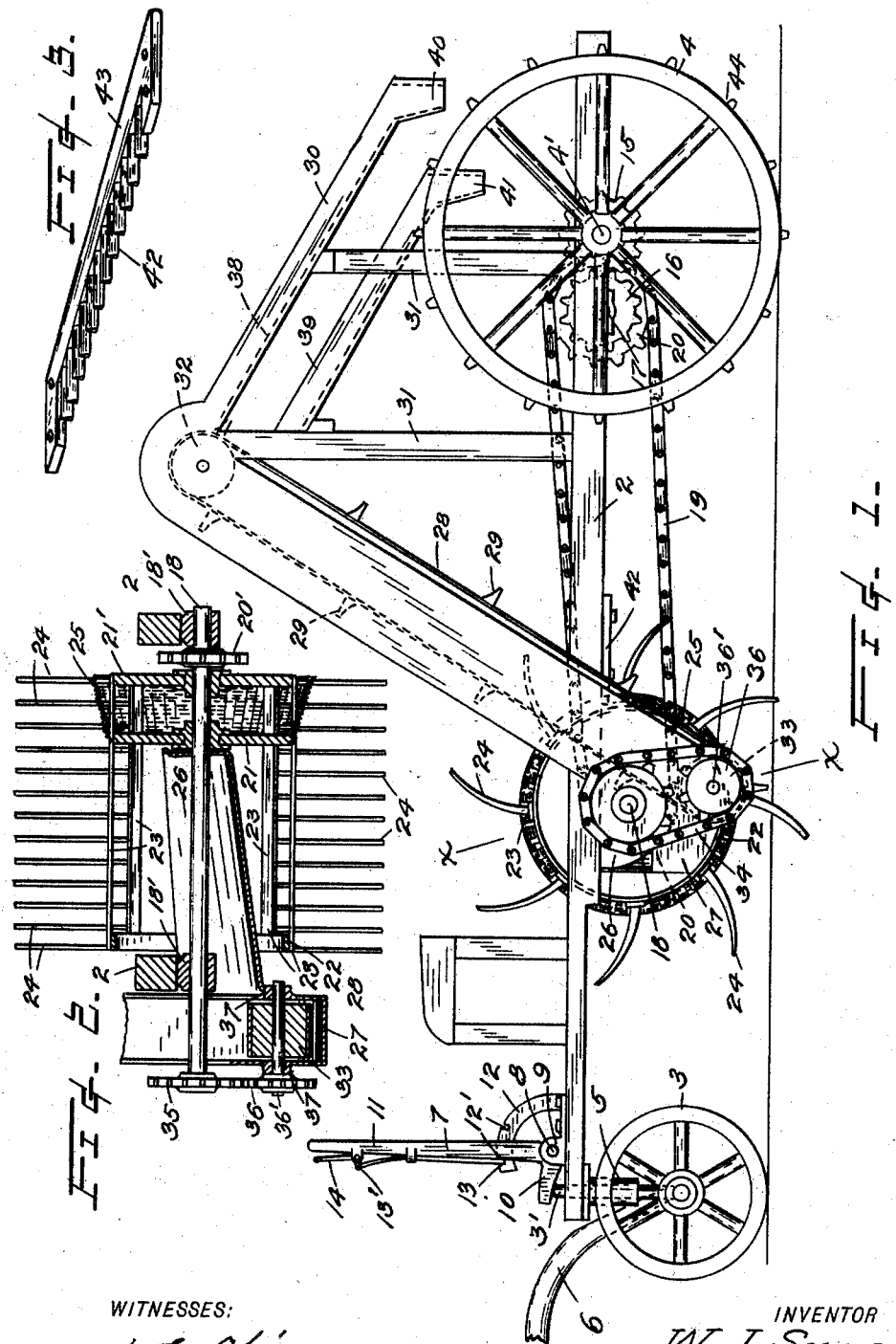

UNITED STATES PATENT OFFICE.

WILLIAM J. SYMONDS, OF SEATTLE, WASHINGTON.

POTATO-DIGGER.

SPECIFICATION forming part of Letters Patent No. 759,937, dated May 17, 1904.

Application filed January 11, 1904. Serial No. 188,457. (No model.)

*To all whom it may concern:*

Be it known that I, WILLIAM JOHN SYMONDS, a subject of the King of England, residing at Seattle, in the county of King and State of Washington, have invented certain new and useful Improvements in Potato-Diggers, of which the following is a specification, reference being had therein to the accompanying drawings.

This invention relates to improvements in potato-diggers, and has for its object to provide a machine of simple, durable, and thoroughly practical construction and capable of rapid and convenient operation.

The invention consists in the construction and novel combination and arrangement of the parts hereinafter described, illustrated in the accompanying drawings, and pointed out in the claims.

In the drawings, Figure 1 is a longitudinal elevation of a potato-digger constructed in accordance with this invention. Fig. 2 is a transverse vertical section taken on line $x\ x$ of Fig. 1. Fig. 3 is a perspective view of the cutter-knives shown in Fig. 1.

The reference-numeral 2 represents the body of a vehicle mounted upon the axles of two pair of wheels 3 and 4, respectively positioned adjacent its ends. The front axle is pivotally connected to the body by a king-pin 3', which extends therethrough and through a socket-piece 5, secured to the body.

6 represents the shafts for the horses to draw the vehicle and are connected directly to the front axle, as commonly done with wagons or the like, whereby the animals may be so driven as to guide the vehicle. A lever 7, fulcrumed at 8 in lugs 9, fastened to the body and having an arm 10 engaging with the end of the said king-pin, is manipulated by the handle-arm 11 of the lever, so as to raise or lower the front end of the body. A sector-plate 12 is provided upon the body, having therein a series of notches 12', which may be individually engaged by lock-bolt 13, slidably connected to the lever-arm 11 and pivotally, as at 13', to a grip-handle 14, fulcrumed to the said lever-arm, whereby the front end of the vehicle-body may be retained at any number of different elevations.

Mounted upon the rear axle 4' is a toothed pinion 15, which meshes with a toothed wheel 16, mounted upon a transversely-arranged shaft 17, and to which is imparted thereby a rotary motion from the wheels 4 when the vehicle is in motion.

18 is a transversely-arranged shaft journaled in suitable boxes 18' at the forward end of the vehicle and is driven from the first-named shaft by a chain 19, passing around sprocket-wheels 20 and 20' upon the respective said shafts.

Fixedly mounted upon shaft 18 is a rotatable digger comprised of two disk members 21 and 21' in proximity with one end of its shaft and an annular member or ring 22 in proximity with its other end and which members are connected with each other by a plurality of peripherally-disposed bars 23, severally formed or provided with a series of curved radially-projecting teeth 24. 25 is an apron, preferably of wire-netting, extending circumferentially about and between the said disk and which slopes toward the ring end of the shaft in order that any potatoes which may fall thereupon will have a tendency to roll in that direction. Positioned interiorly of the digger is a hopper-trough 26, which extends from the disk 21 to within a conveyer-boot 27, exteriorly thereof, for the purpose of catching the tubers as they drop from the revolving teeth and delivering same to the said boot. From this boot the tubers are carried by a conveyer-belt 28, provided with suitable bucket attachments, such as 29, to a distributing hopper-trough 30, supported upon framework 31 above the vehicle-body, as shown in Fig. 1. This conveyer-belt passes around pulleys 32 and 33, either one of which may be the driver; but I prefer to utilize the lower one, 33, for this purpose and drive it by means of sprocket-chain 34 and wheels 35 and 36, mounted, respectively, upon the shaft 18 and the shaft 36' of the last-named wheel. This shaft 36' may advantageously be journaled in bearings 37, provided in the side walls of the boot. The bottom of the distributing-chute 30 is formed or provided with a series of parallel longitudinally-arranged bars 38, separated such a distance apart that only the smaller or "seedling" potatoes will fall into a chute 39 therebeneath, while the larger ones slide thereover, and both the larger and smaller sizes of potatoes are delivered from the end nozzles 40 and 41, respectively, into sacks held therebeneath.

A series of knives 42 (see Fig. 3) are integrally connected together by a back bar 43, which is fastened to the body, so that the several knives will project between digger-teeth 24 for the purpose of dividing or cutting up such vines as are carried around with the digger-teeth and which if not removed would seriously interfere with the efficiency of the apparatus.

The operation will be understood from the foregoing description, and from which it is apparent that the digger-teeth revolve in an opposite direction from the direction of the rotation of the vehicle-wheels and that the power to actuate the digging device is obtained from the rolling of the wheels 4 upon the surface. Under certain conditions of soil peripheral spurs 44 may advantageously be provided upon the said wheels to prevent the same from slipping. The various parts are proportioned according to the work to be done and the character of the ground; but I prefer to make it in width, say, about thirty inches, so as to span but a single row of potatoes at one time.

Having described my invention, what I claim as new, and desire to secure by Letters Patent, is—

1. In a potato-digger, the combination of a vehicle-body, two pairs of wheels for said body positioned adjacent its ends the axle of the front pair of wheels being pivotally connected to the body, means to raise or lower front end of the body relatively of the adjacent wheels, a series of revoluble teeth, means to drive said teeth from the axle of the rear wheels, a trough projecting from within the concentric series of digger-teeth to within a boot of a conveyer, said conveyer connecting said boot with a distributing-chute, said chute, means to drive said conveyer, and the cutter-knives, substantially as set forth.

2. In a potato-digger, the combination with the supporting-vehicle, and the driving means, of a transversely-arranged shaft, two disks mounted upon the shaft, a ring concentric of the shaft, peripherally-arranged bars connecting the said disks and the ring, radiating teeth formed or provided upon the said bars, an annular apron between the planes of the said disks, and the trough within the series of digger-teeth, substantially as set forth.

In testimony whereof I affix my signature in presence of two witnesses.

WILLIAM J. SYMONDS.

Witnesses:
PIERRE BARNES,
HENRY S. NOON.